(12) United States Patent
Bartnick et al.

(10) Patent No.: US 8,919,378 B2
(45) Date of Patent: Dec. 30, 2014

(54) COMPACT ELECTRICALLY CONTROLLED FOUR-WAY VALVE WITH PORT MIXING

(75) Inventors: Brian K. Bartnick, Ortonville, MI (US); Corry W Johnson, Orion Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 367 days.

(21) Appl. No.: 13/439,193

(22) Filed: Apr. 4, 2012

(65) Prior Publication Data
US 2013/0263949 A1 Oct. 10, 2013

(51) Int. Cl.
*F16K 11/085* (2006.01)
*F16K 5/04* (2006.01)

(52) U.S. Cl.
USPC ................... 137/625.47; 251/317.01

(58) Field of Classification Search
USPC ................... 137/625.47; 251/317.01
See application file for complete search history.

(56) References Cited

U.S. PATENT DOCUMENTS

| | | | |
|---|---|---|---|
| 1,122,848 A | 12/1914 | Bloom | |
| 2,051,278 A | 8/1936 | Svenson | |
| 2,547,116 A | 4/1951 | Gould | |
| 2,578,396 A | 12/1951 | Brown | |
| 3,133,723 A * | 5/1964 | Goldman et al. | 251/309 |
| 3,991,975 A * | 11/1976 | Sibrava | 251/317 |
| 3,993,099 A * | 11/1976 | Nightingale | 137/625.48 |
| RE30,224 E * | 3/1980 | Ortega | 137/625.47 |
| 4,262,880 A * | 4/1981 | Danko et al. | 251/288 |
| 4,540,025 A | 9/1985 | Ledeen et al. | |
| 4,890,817 A | 1/1990 | Uri | |
| 4,958,802 A * | 9/1990 | Underwood | 251/310 |
| 5,037,067 A * | 8/1991 | Ray | 251/314 |
| 5,113,909 A | 5/1992 | Marin et al. | |
| 5,152,321 A * | 10/1992 | Drager et al. | 137/625.29 |
| 5,188,144 A * | 2/1993 | Radossi | 137/315.25 |
| 5,234,193 A * | 8/1993 | Neal et al. | 251/175 |
| 5,327,929 A * | 7/1994 | Radossi | 137/315.26 |
| 5,511,584 A | 4/1996 | Leinen | |
| 5,680,889 A | 10/1997 | Boger | |
| 5,771,929 A | 6/1998 | Boger | |
| 5,906,297 A | 5/1999 | Cole | |
| 5,931,196 A * | 8/1999 | Bernardi et al. | 137/625.46 |
| 6,575,195 B2 * | 6/2003 | Wichmann | 137/625.17 |
| 6,874,759 B2 | 4/2005 | Aoshima et al. | |
| 7,044,436 B2 | 5/2006 | Corbetta et al. | |
| 2006/0137536 A1 | 6/2006 | De Jong | |

OTHER PUBLICATIONS

U.S. Appl. No. 13/216,631, filed Aug. 24, 2011; inventors: Brian K. Bartnick and Corry W. Johnson.
U.S. Appl. No. 13/439,193, filed Apr. 4, 2012; inventors: Brian K. Bartnick and Jr., Corry W. Johnson.

(Continued)

*Primary Examiner* — John Fox

(57) ABSTRACT

A compact four-way fluid flow control valve wherein an inlet port and three outlet ports are all disposed on the sidewall of a manifold. A valve core is rotatably disposed within the manifold, and has first and second core openings. Annular seals are disposed at blind portions of the sidewall of the valve core in non-circumscribing relation to the core openings and in abutting relation to the manifold. Rotation of the valve core with respect to the manifold provides selected fluid flow to any of the outlet ports, as well as a trickle flow at a selected outlet port and fluid mixing between selected outlet ports.

18 Claims, 10 Drawing Sheets

(56) References Cited

OTHER PUBLICATIONS

U.S. Appl. No. 13/413,079, filed Mar. 6, 2011; inventors: Pablo Valencia, Jr. and Brian K. Bartnick.

Faucet Valve Insert having diagonally disposed O-ring and channel therefor of Moen Incorporated, North Olmstead, OH 44070. Believed on the market at least since 1990.

Generic Prior Art O-Rings and Channels Therefor. Known since at least before 2010.

Generic variable flow control valve, believed in use at least since 2010.

U.S. Appl. No. 13/118,751, filed May 31, 2011; inventors: Brian K. Bartnick, Pablo Valencia, Jr., Corry W. Johnson, and Bill F. Tompkins.

* cited by examiner

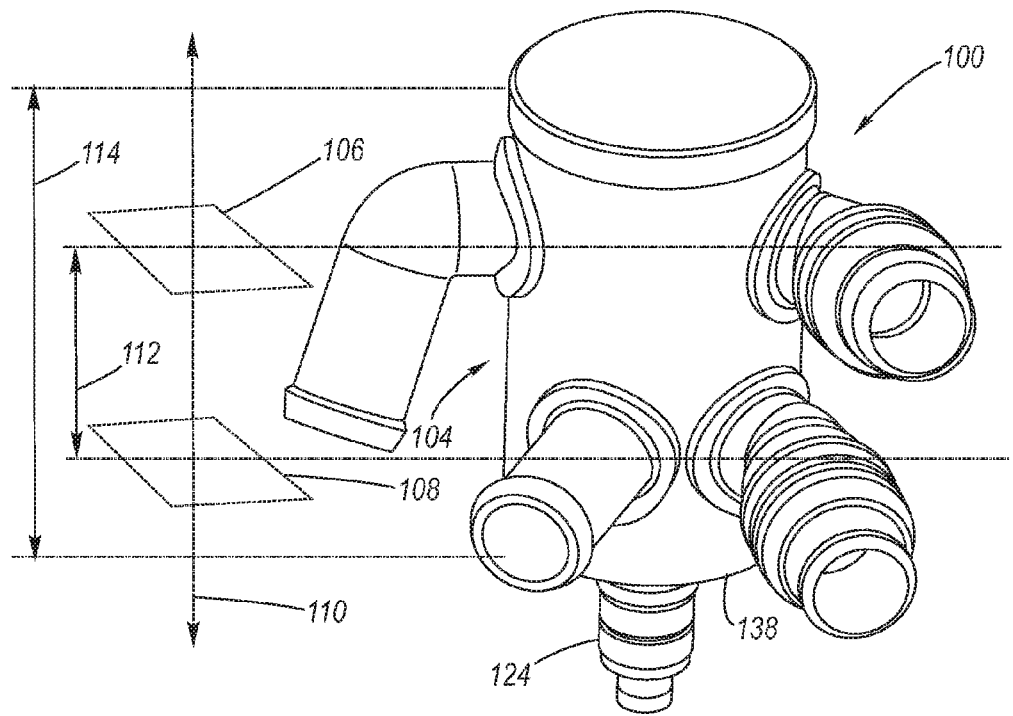
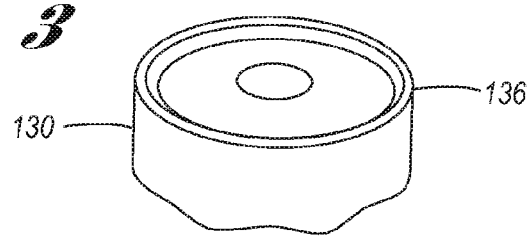
Fig. 3
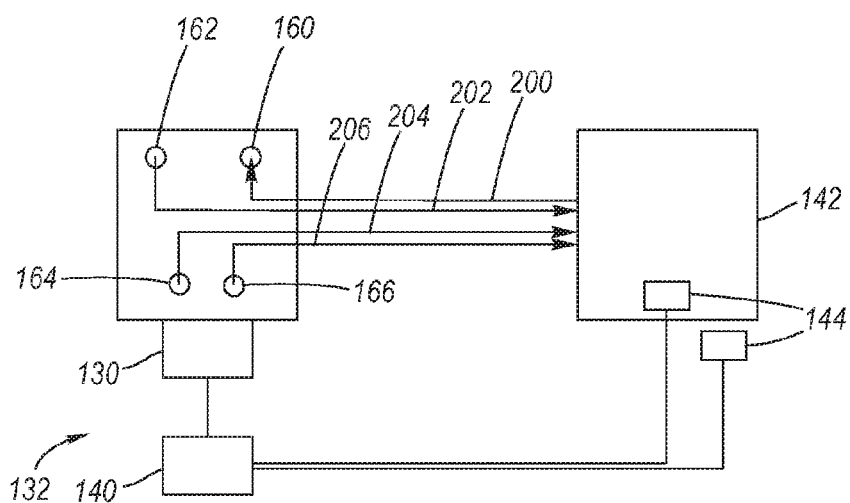
Fig. 4

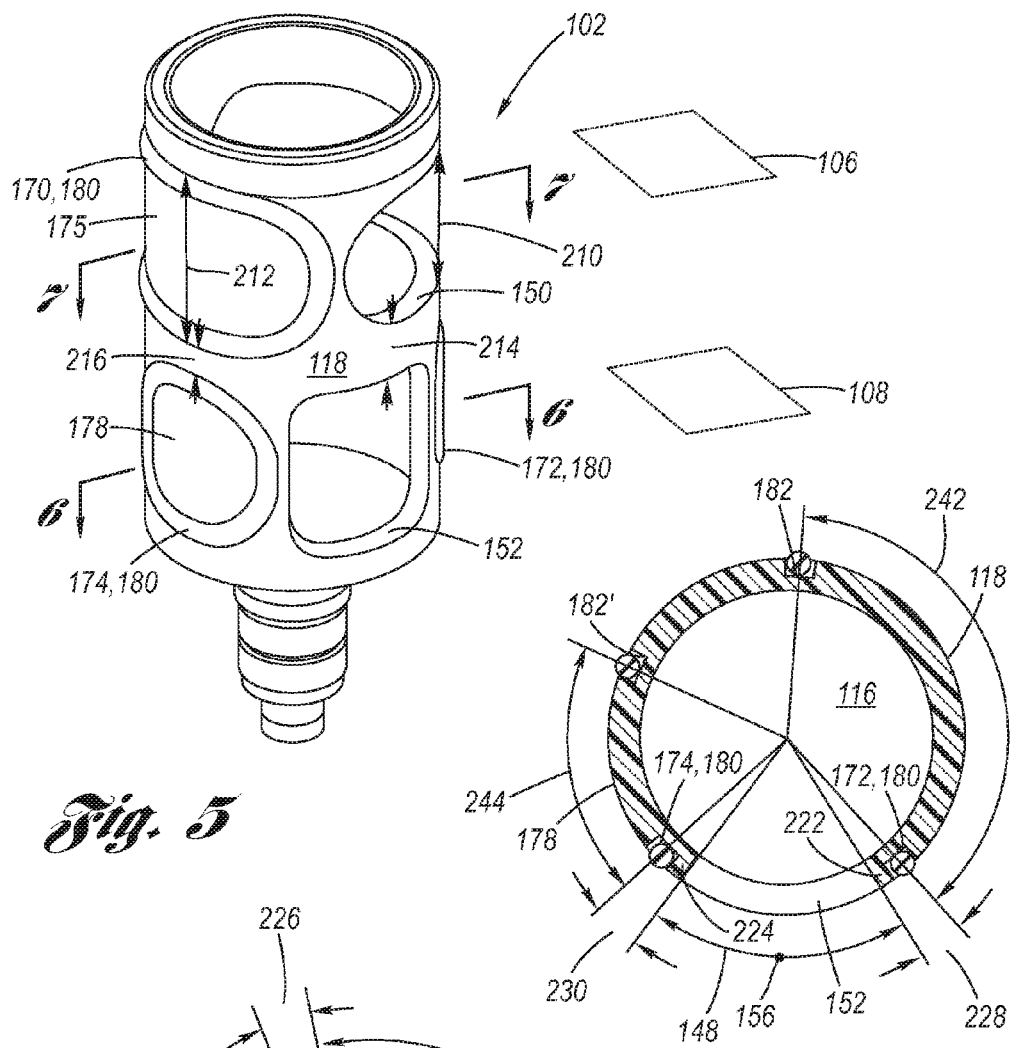
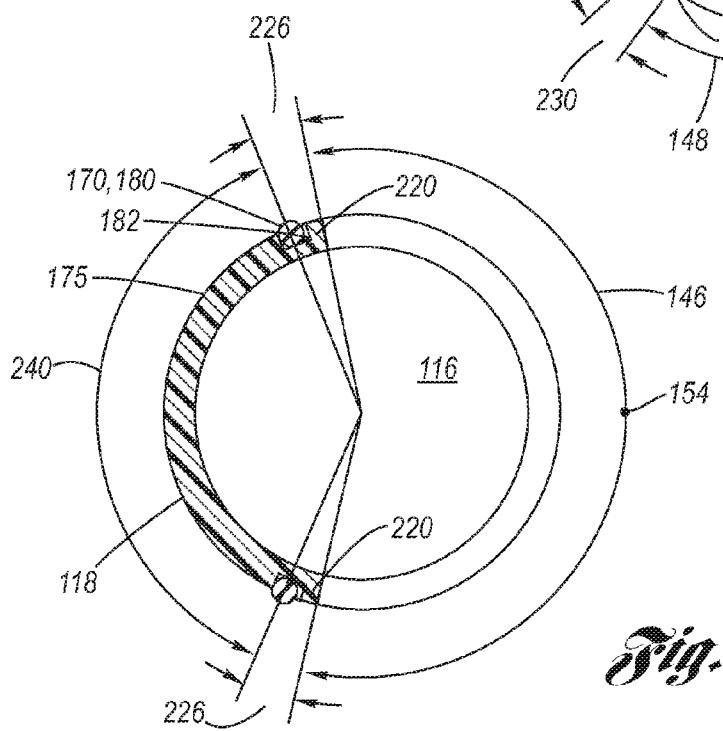

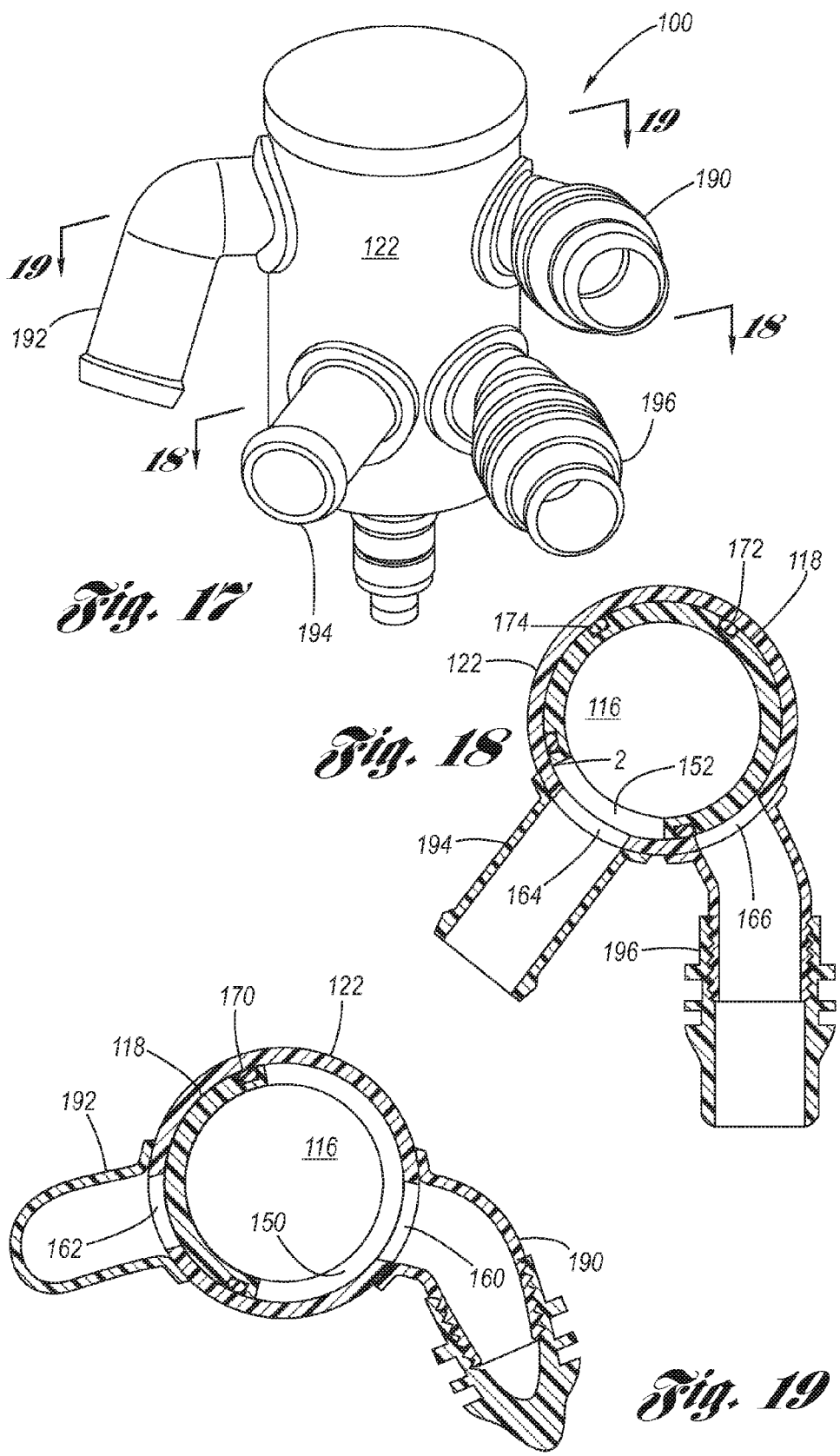

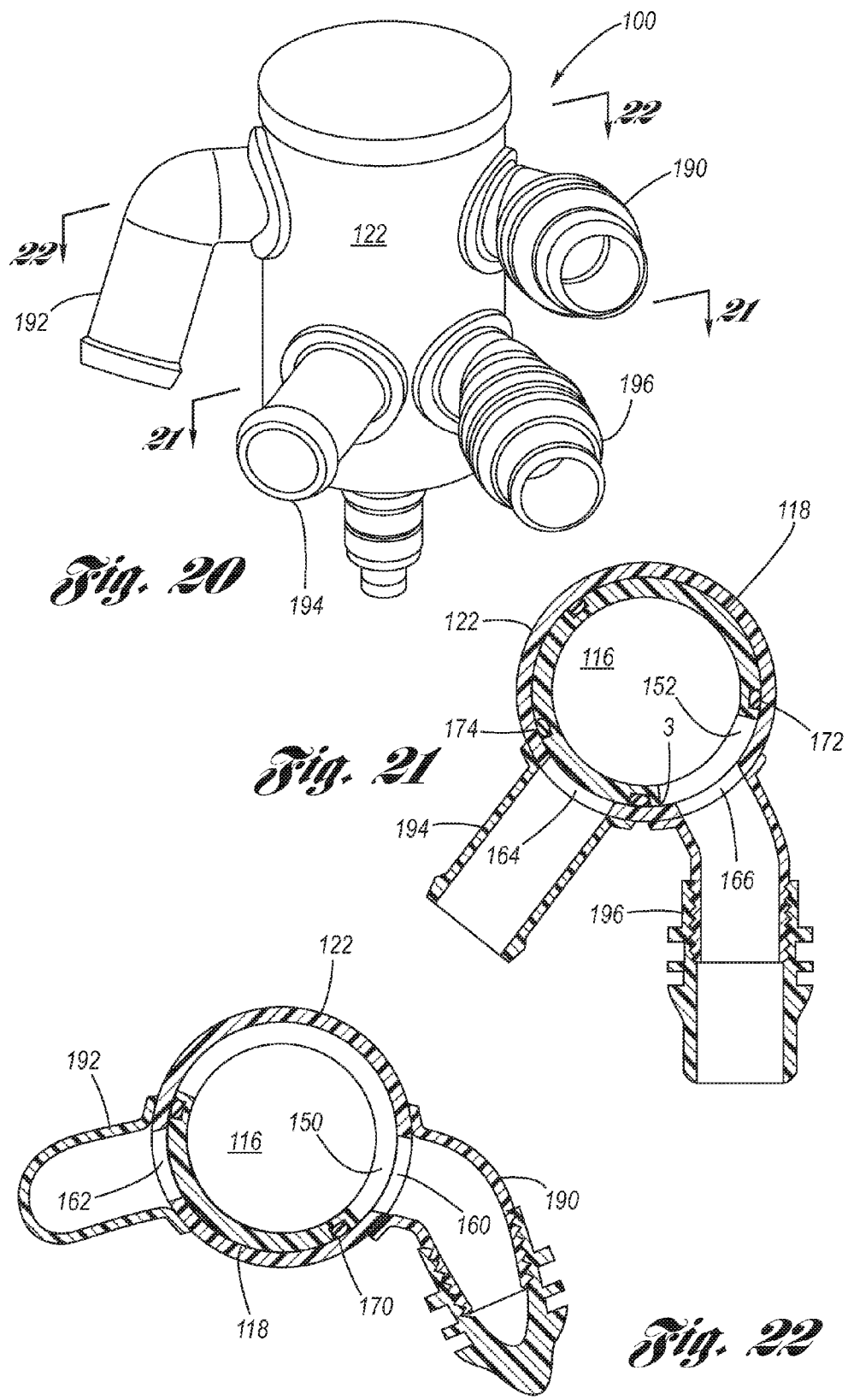

COMPACT ELECTRICALLY CONTROLLED FOUR-WAY VALVE WITH PORT MIXING

TECHNICAL FIELD

The present invention relates to fluid flow control valves and more particularly to a compact four-way fluid flow control valve, wherein the inlet and outlet ports are all disposed on a sidewall of the valve.

BACKGROUND OF THE INVENTION

Fluid flow control valve mechanisms utilize one or more fluid valve ports for the purpose of controlling flow of a fluid. Typically, a fluid flow control valve includes a first valve body having at least one port fluidically communicating with one or more fluid transfer lines for providing delivery and/or removal of fluid with respect to a fluid flow system, and further includes a second valve body, movable in relation to the first valve body, having one or more ports which are alignable with the one of more ports of the first valve body. Depending on the degree of the alignment, fluid flow through the fluid flow control valve is regulated. The degree of alignment may be controlled by a motive device (i.e., a motor) which is electronically controlled.

What remains needed in the art is a compact four-way fluid flow control valve, particularly suitable for motor vehicle coolant systems, wherein the inlet and outlet ports are all disposed on the manifold sidewall of the valve, and wherein provided are: prevention of cross-port leakage, a range of fluid port opening sizes, fluid flow mixing between selected ports, allowance for of manufacturing variation, and robustness with respect to debris present in the fluid.

SUMMARY OF THE INVENTION

The present invention is a compact four-way fluid flow control valve wherein the inlet and outlet ports are all disposed on a manifold sidewall of the valve, and wherein provided are: prevention of cross-port leakage, a range of fluid port opening sizes, fluid flow mixing between selected ports, allowance for of manufacturing variation, and robustness with respect to debris present in the fluid.

The compact four-way fluid flow control valve according to the present invention includes a hollow valve core defined by a cylindrically shaped core sidewall which is rotatively disposed within a hollow manifold defined by a cylindrically shaped manifold sidewall. For geometrical reference purposes, a first valve plane and a second valve plane are both transversely disposed with respect to a longitudinal valve axis, wherein the first valve plane is offset with respect to the second valve plane along the longitudinal valve axis.

The valve core has a drive stem at one longitudinal end thereof which passes out of the cylindrical manifold so as to be rotatively driven by an electrical drive system. The core sidewall has a first core opening formed therein which is preferably bisected by the first valve plane, and further has a second core opening formed therein which is preferably bisected by the second valve plane. Each of the first and second core openings has a respective predetermined circumferential location on the core sidewall, as well as a respective predetermined angular range of the circumference of the core sidewall, wherein the first core opening has an angular range much larger than that of the second core opening.

The manifold has four ports formed in the manifold sidewall, namely: a first outlet port, a second outlet port, a third outlet port, and an inlet port. The inlet port and the first outlet port are preferably bisected by the first valve plane, and the second and third outlet ports are preferably bisected by the second valve plane. Each of the inlet port and the first outlet port have a first predetermined mutual angular separation of the circumference of the manifold sidewall, and each of the second and third outlet ports have a second predetermined mutual angular separation of the circumference of the manifold sidewall, wherein the first predetermined angular separation is much larger than the second predetermined angular separation.

The valve core has first, second and third annular seals disposed at blind portions of the core wall which are interstitial with respect to the first and second core openings (that is, none of the annular seals is disposed in circumscribing relation to either of the core openings). The annular seals may be O-rings seated in the core wall or may be convex loops integrally formed of an overmold of the valve core.

In operation, a fluid flow system is connected to each of the inlet port and the first, second and third outlet ports, wherein the fluid flow system may be for example a motor vehicle coolant system. An electric motor of an electrical drive system selectively rotates the valve core with respect to the manifold via electronic control responsive to sensed conditions of the fluid flow system. The first second and third annular seals are mutually disposed relative to the first and second core openings, and the first and second core openings and the first, second and third annular seals are disposed relative to the inlet port and the first, second and third outlet ports such that when the valve core is rotated with respect to the manifold, the inlet port can fluidically communicate exclusively with any one of the first, second and third outlet ports, and can mix fluid between the first and second outlet ports and between the second and third outlet ports.

Accordingly, it is an object of the present invention to provide a compact four-way fluid flow control valve wherein the inlet and outlet ports are all disposed on the manifold sidewall, wherein annular seals are disposed at blind areas interstitial to the core openings which minimizes cross port leakage and sliding drag, while also providing maximized angular range of fluid passage through the ports, including individual outlet port exclusivity and fluid mixing with selected outlet ports, robustness with respect to fluid borne debris, and allowance for manufacturing variation.

This and additional objects, features and advantages of the present invention will become clearer from the following specification of a preferred embodiment.

BRIEF DESCRIPTION OF THE DRAWINGS

FIG. 3 is an isometric, front facing view of the compact four-way fluid flow control valve according to the present invention, showing additionally a portion of an electrical drive system therefor.

FIG. 4 is a schematic representation of the compact four-way fluid flow control valve operatively interfaced with a fluid flow control system.

FIG. 5 is an isometric view of the valve core of the compact four-way fluid flow control valve according to the present invention, showing annular seals in the from of O-rings disposed in grooves.

FIG. 6 is a sectional view of the valve core of the compact four-way fluid flow control valve according to the present invention, seen along line 6-6 of FIG. 5.

FIG. 7 is a sectional view of the valve core of the compact four-way fluid flow control valve according to the present invention, seen along line 7-7 of FIG. 5.

FIG. 17 is an isometric, front facing view of the compact four-way fluid flow control valve according to the present invention.

FIG. 18 is a sectional view of the compact four-way fluid flow control valve according to the present invention, seen along line 18-18 of FIG. 17, wherein 100% of fluid flow to the second outlet port is provided.

FIG. 19 is a sectional view of the compact four-way fluid flow control valve according to the present invention, seen along line 19-19 of FIG. 17, wherein 100% of fluid flow to the second outlet port is provided.

FIG. 20 is an isometric, front facing view of the compact four-way fluid flow control valve according to the present invention.

FIG. 21 is a sectional view of the compact four-way fluid flow control valve according to the present invention, seen along line 21-21 of FIG. 20, wherein 100% of fluid flow to the third outlet port is provided.

FIG. 22 is a sectional view of the compact four-way fluid flow control valve according to the present invention, seen along line 22-22 of FIG. 20, wherein 100% of fluid flow to the third outlet port is provided.

DESCRIPTION OF THE PREFERRED EMBODIMENT

Figure 1:
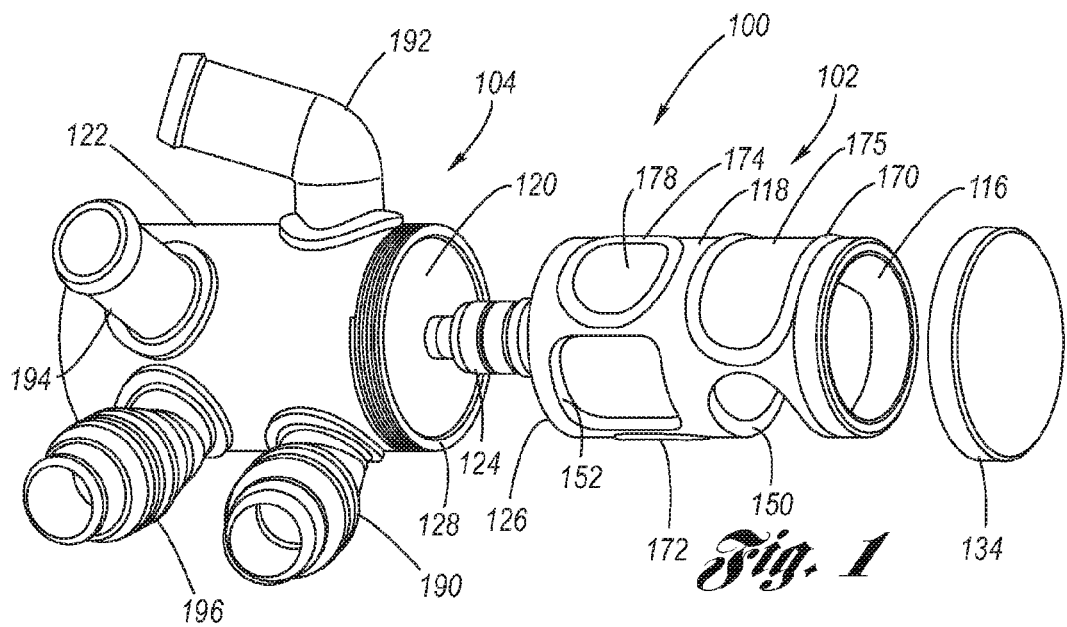
FIG. 1 is an exploded, isometric, front facing view of the compact four-way fluid flow control valve according to the present invention.
Figure 2:
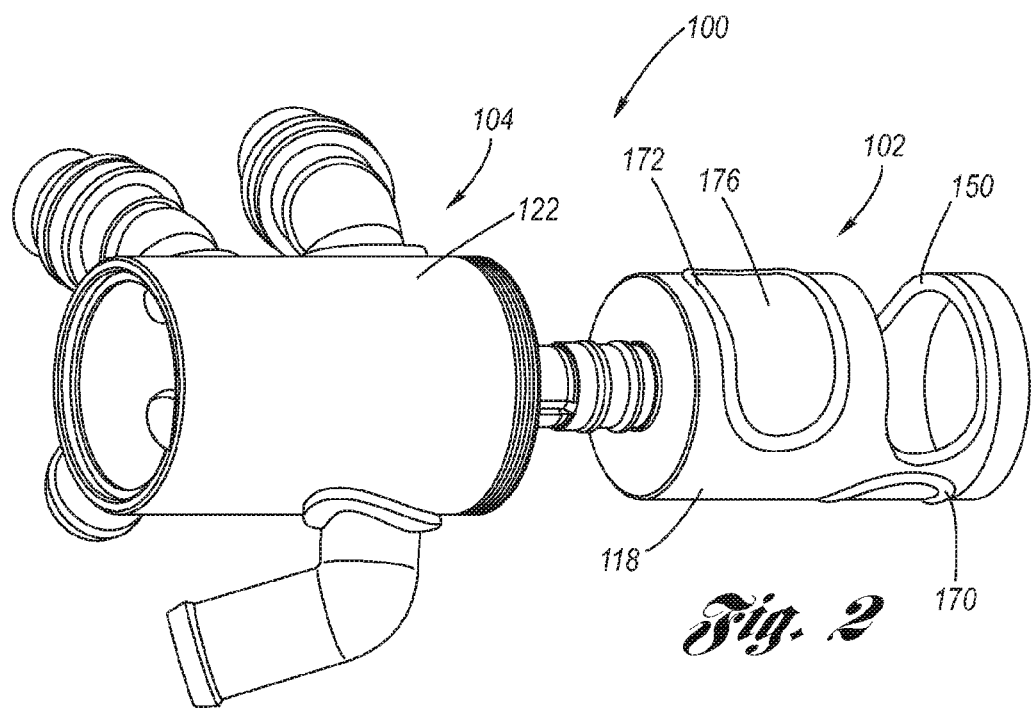
FIG. 2 is an exploded, isometric, rear facing view of the compact four-way fluid flow control valve according to the present invention (the manifold cap being omitted).

Referring now to the Drawings, FIGS. 1 through 27 depict various aspects of a compact four-way fluid flow control valve according to the present invention.

Turning attention firstly to FIGS. 1 through 4, depicted is the compact four-way fluid flow control valve 100 in accordance with the present invention, which includes a valve core 102 rotatively disposed within a manifold 104. As shown at FIG. 3, for geometrical reference purposes, a first valve plane 106 and a second valve plane 108 are both transversely disposed with respect to a longitudinal valve axis 110, wherein the first valve plane is separated with respect to the second valve plane by a planes separation 112 parallel to the longitudinal valve axis, the planes separation being less than the longitudinal height 114 of the manifold. The valve core 102 has a hollow interior space 116 defined by a cylindrically shaped core sidewall 118. The manifold has a hollow interior space 120, whereat is rotatively disposed the valve core 102, defined by a cylindrically shaped manifold sidewall 122.

The valve core 102 has a drive stem 124 at a longitudinal end 126 which passes out of the manifold 104 so as to be rotatively driven by an electric motor 130 of an electrical drive system 132, by way of example as that schematically shown at FIG. 4. The electric motor 130 has a housing 136 which is sealingly interfaced with the lower longitudinal end 138 of the manifold 104, and the upper longitudinal end 128 of the manifold via a manifold cap 134, which by way of example (as shown) may be threadingly engaged with the manifold sidewall 122. The electric motor 130 rotates the valve core 102 clockwise or counterclockwise with respect to the manifold 104 by command of an electronic controller 140 responsive to its programming and the sensed condition of a fluid flow system 142 via data from various sensors 144. By way of example, the fluid flow system 142 may be a coolant system of a motor vehicle.

As best seen at FIGS. 5 through 7, the core sidewall 118 has a first core opening 150 formed therein which is preferably bisected by the first valve plane 106, and further has a second core opening 152 formed therein which is preferably bisected by the second valve plane 108. Each of the first and second core openings 150, 152 has a respective predetermined circumferential location of the core sidewall, comparatively indicated with respect to FIGS. 6 and 7, in which a center arc point 154 of the first core opening is circumferentially displaced from the center arc point 156 of the second core opening, by of example one hundred twenty degrees. Additionally, each of the first and second core openings 150, 152 has a respective predetermined angular range of the circumference of the core sidewall 118, wherein the first core opening has an angular range much larger than that of the second core opening. By way of example, as indicated at FIGS. 6 and 7, the first core opening 150 may have an angular range 146 of about 204 degrees of arc, and the second core opening 152 may have an angular range 148 of about seventy degrees of arc.

Figure 11:
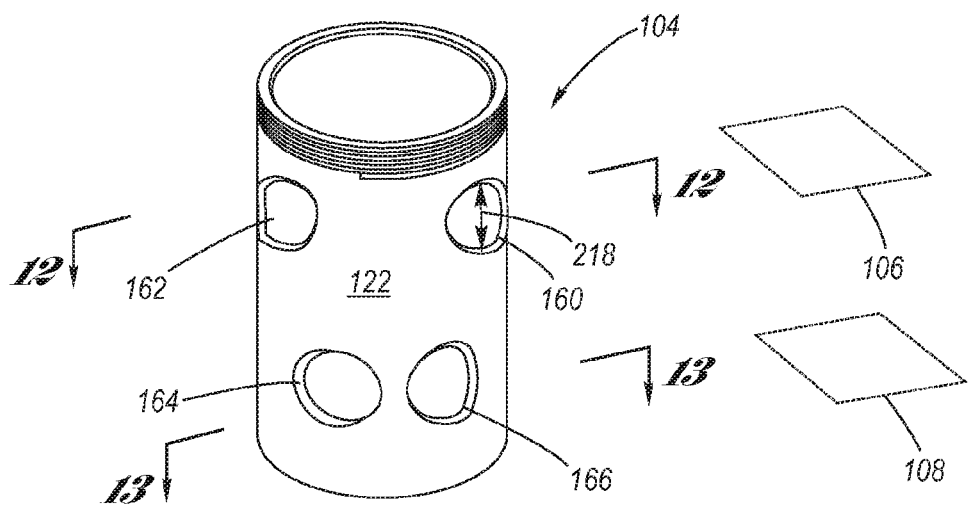
FIG. 11 is an isometric, front facing view of the manifold of the compact four-way fluid flow control valve according to the present invention.
Figure 12:
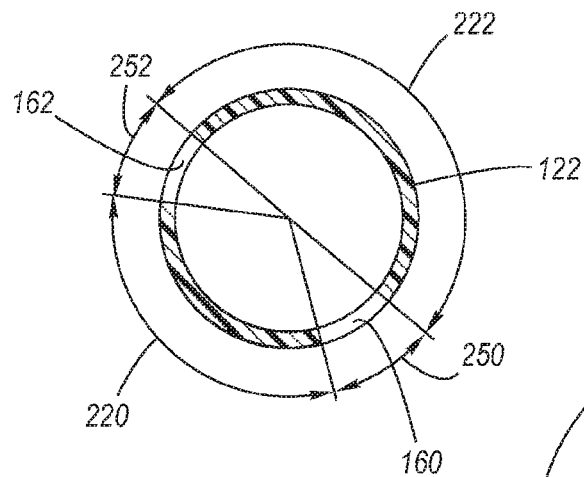
FIG. 12 is a sectional view of the manifold of the compact four-way fluid flow control valve according to the present invention, seen along line 12-12 of FIG. 11.
Figure 13:
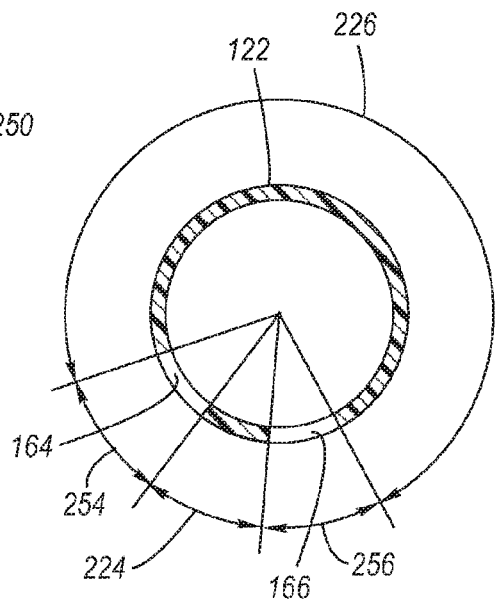
FIG. 13 is a sectional view of the manifold of the compact four-way fluid flow control valve according to the present invention, seen along line 13-13 of FIG. 11.

As best seen at FIGS. 11 through 13, the manifold 104 has four ports formed in the manifold sidewall 122, namely: an inlet port 160, a first outlet port 162, a second outlet port 164, and a third outlet port 166. The inlet port 160 and the first outlet port 162 are preferably bisected by the first valve plane 106, and the second and third outlet ports 154, 156 are preferably bisected by the second valve plane 108. As shown by way of example at FIGS. 12 and 13, the inlet port 160 may have an angular range 250 of about thirty three degrees of arc, the first outlet port 162 may have an angular range 252 of about thirty three degrees of arc, the second outlet port 164 may have an angular range 254 of about thirty three degrees of arc, and the third outlet port 166 may have an angular range 256 of about thirty three degrees of arc. Each of the inlet port and the first, second and third outlet ports are preferably circular, but other shapes are possible.

Each of the inlet port 160 and the first outlet port 162 have a first predetermined mutual minimal circumferential displacement at the manifold sidewall 122, and each of the second and third outlet ports 164, 166 have a second predetermined mutual minimal circumferential displacement at the manifold sidewall, wherein the first predetermined mutual minimal circumferential displacement is much larger than the second predetermined mutual minimal circumferential displacement. By way of example, as indicated at FIGS. 12 and 13, the inlet port 160 may have a first predetermined mutual minimal circumferential displacement 220 with respect to the first outlet port 162 of about one hundred sixteen degrees of arc, and may have a first predetermined mutual maximal circumferential displacement 222 with respect to the first outlet port of about one hundred seventy six degrees of arc; and the second outlet port may have a second predetermined mutual minimal circumferential displacement 224 with respect to the third outlet port 164 of about thirty two degrees of arc, and may have a second predetermined mutual maximal circumferential displacement 226 with respect to the third outlet port of about two hundred sixty degrees of arc.

Returning again to FIGS. 1 and 2 as well as to FIGS. 6 and 7, the valve core 102 has a first annular seal 170 which is preferably bisected by the first plane 106, and further has second and third annular seals 172, 174 which are preferably bisected by the second plane 108. Each of the first, second and third annular seals 170, 172, 174 are disposed on the core sidewall 118 in abutting relation to the manifold sidewall 122 (see for example FIGS. 15 and 16) at respective first, second and third blind portions 175, 176, 178 of the core sidewall which are disposed interstitially with respect to the first and second core openings 150, 152; that is, none of the first, second and third annular seals is disposed in circumscribing relation to either of the first and second core openings. By way of example, as indicated at FIGS. 6 and 7, the first annular seal 170 may have an angular range 240 of about one hundred thirty four degrees of arc, the second annular seal 172 may have an angular range 242 of about one hundred thirty degrees of arc, and the third annular seal 174 may have an angular range 244 of about sixty six degrees of arc.

Figure 8:
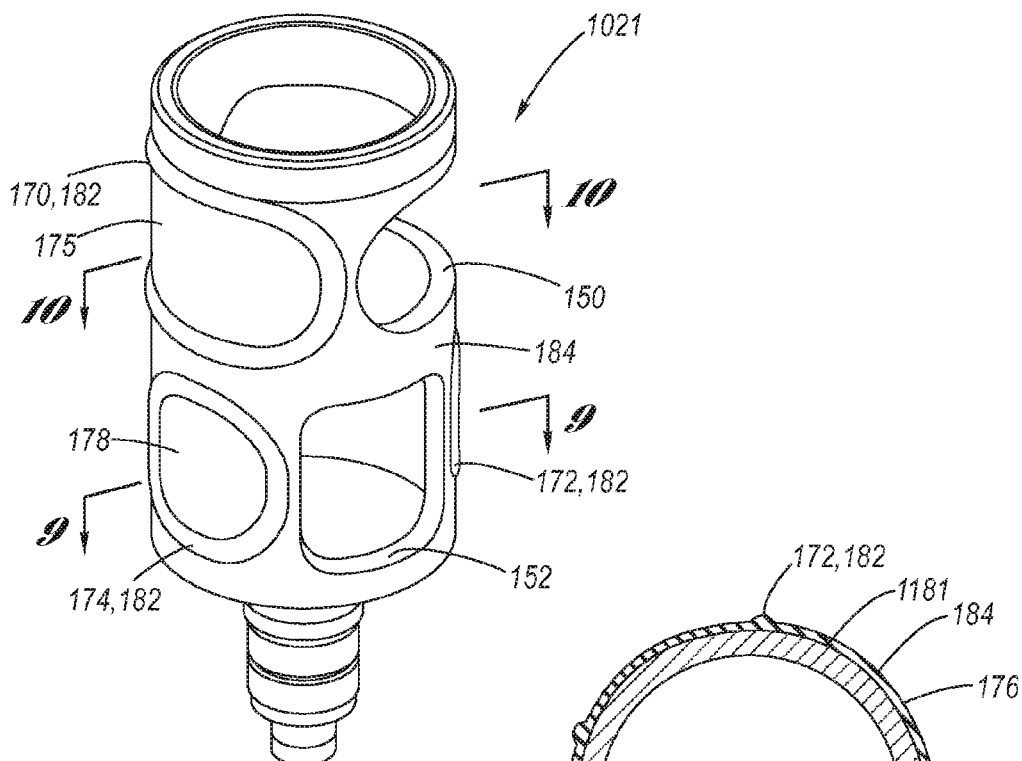
FIG. 8 is an isometric view of the valve core of the compact four-way fluid flow control valve according to the present invention, showing annular seals which are integral of an overmold of the valve core.
Figure 9:
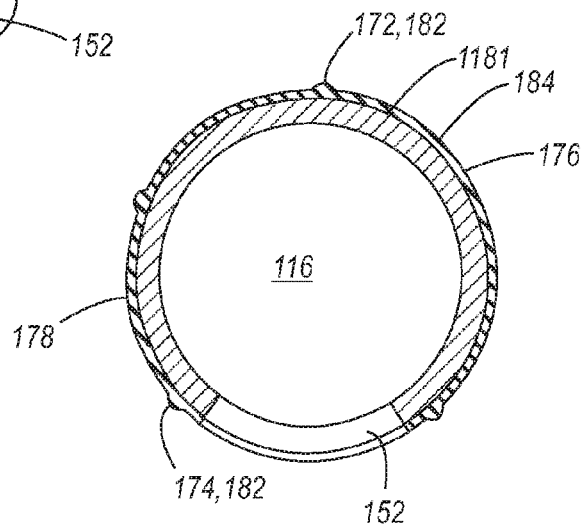
FIG. 9 is a sectional view of the valve core of the compact four-way fluid flow control valve according to the present invention, seen along line 9-9 of FIG. 8.
Figure 10:
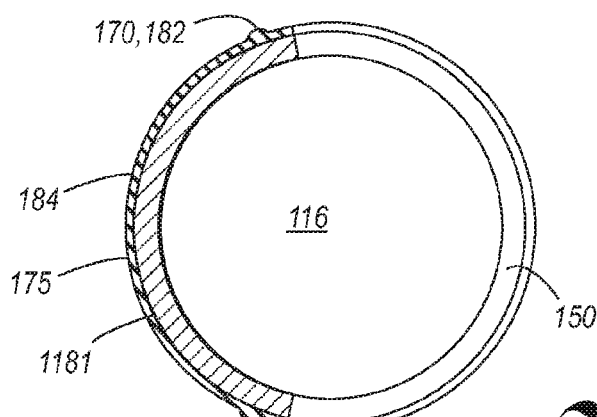
FIG. 10 is a sectional view of the valve core of the compact four-way fluid flow control valve according to the present invention, seen along line 10-10 of FIG. 8.

As depicted at FIGS. 8 through 10, the first, second and third annular seals 170, 172, 174 may be in the form of O-rings 180 seated in slots 182 of the core sidewall, wherein the techniques for retaining the O-rings as described in U.S. patent application Ser. No. 13/118,751, filed on May 31, 2011 to applicants B. Bartnick, P. Valencia, Jr., C. Johnson and B. Tompkins and assigned to the assignee hereof, entitled "Fluid Valve Port Optimized for Robustness with Standard O-Ring Seal", the disclosure of which is hereby incorporated herein by reference.

Alternatively, as depicted at FIGS. 8 through 10, and as may be more preferred over O-rings, the first, second and third annular seals 170, 172, 174 may be convex loops 182 integrally formed of an overmold 184 of the core sidewall 1181 of the valve core 1021, wherein, by way of example the valve core may be composed of aluminum and the overmold of EPDM (ethylene propylene diene monomer M class rubber).

The first second and third annular seals are mutually disposed relative to the first and second core openings, and the first and second core openings and the first, second and third annular seals are disposed relative to the inlet port and the first, second and third outlet ports such that when the valve core is rotated with respect to the manifold, the inlet port can fluidically communicate exclusively with any one of the first, second and third outlet ports, and can mix fluid between the first and second outlet ports and between the second and third outlet ports. By way of exemplification in this regard, comparatively considering FIGS. 5 and 11, the longitudinal diameter 210 of the first core opening 150, and similarly as well, that of the second core opening 152 exceeds the diameter 218 of the inlet port 160, and similarly as well, that of the diameters of the first, second and third outlet ports 162, 164, 166; the first, second and third annular seals 170, 172, 174 have a longitudinal diameter 212 at least as large as that of the first and second core openings (see for example the port cross-sections at FIGS. 15 and 16); the first and second core openings are longitudinally spaced apart by a length 214 that is at least as large as the length 216 of longitudinal spacing between the first annular seal with respect to the second and third annular seals. Further by way of exemplification, as depicted at FIGS. 6 and 7, the first annular seal 170 may have an angular range 240 of about one hundred thirty four degrees of arc; the second annular seal 172 may have an angular range 242 of about one hundred thirty degrees of arc; and the third annular seal 174 may have an angular range 244 of about sixty six degrees of arc.

Referring now to FIGS. 14 through 27 operation of the compact four-way fluid flow control valve 100 will be detailed, wherein each of the inlet port 160, and the first, second and third outlet ports 162, 164, 166 are shown provided with a respective external port fitting 190, 192, 194, 196 for providing connection interface with a fluid flow system, as for example fluid flow system 142 of FIG. 4, via fluid lines 200, 202, 204, 206, and wherein, as described with respect to FIGS. 3 and 4, an electric motor 130 of the electrical drive system 132 selectively rotates the valve core with respect to the manifold via electronic control responsive to sensed conditions of the fluid flow system. In this regard, depending on the relative position of the first core opening with respect to the inlet port and the first outlet port, and on the relative position of the second core opening with respect to the second and third outlet ports, the fluid flow is precisely controlled from the inlet port to any of the first, second and third outlet ports.

Figure 14:
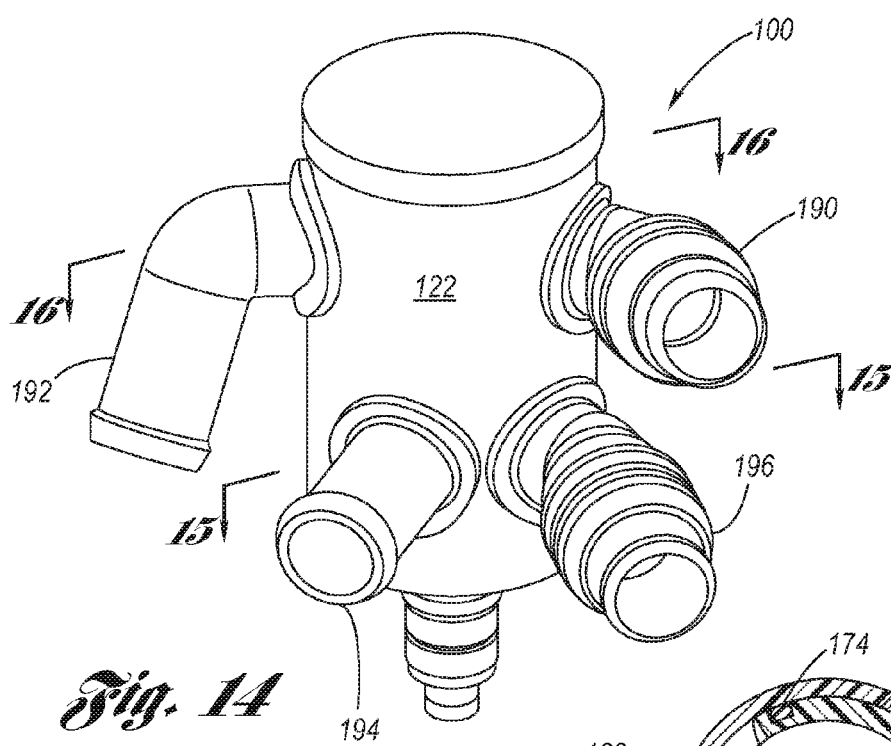
FIG. 14 is an isometric front facing view of the compact four-way fluid flow control valve according to the present invention.
Figure 15:
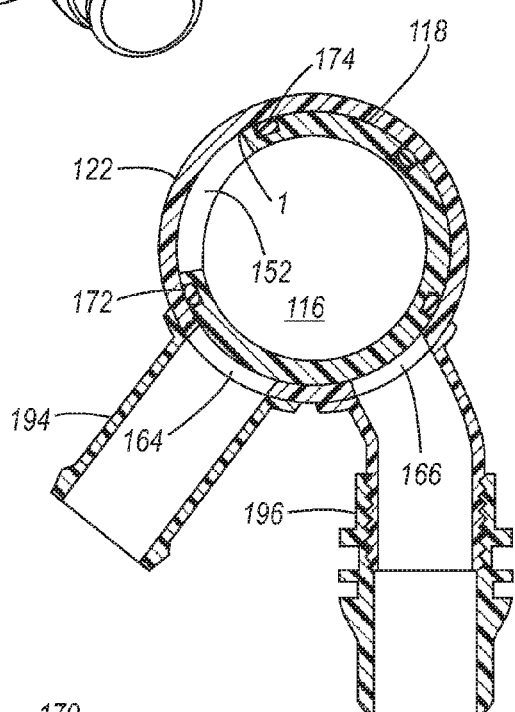
FIG. 15 is a sectional view of the compact four-way fluid flow control valve according to the present invention, seen along line 15-15 of FIG. 14, wherein 100% of fluid flow to the first outlet port is provided.
Figure 16:
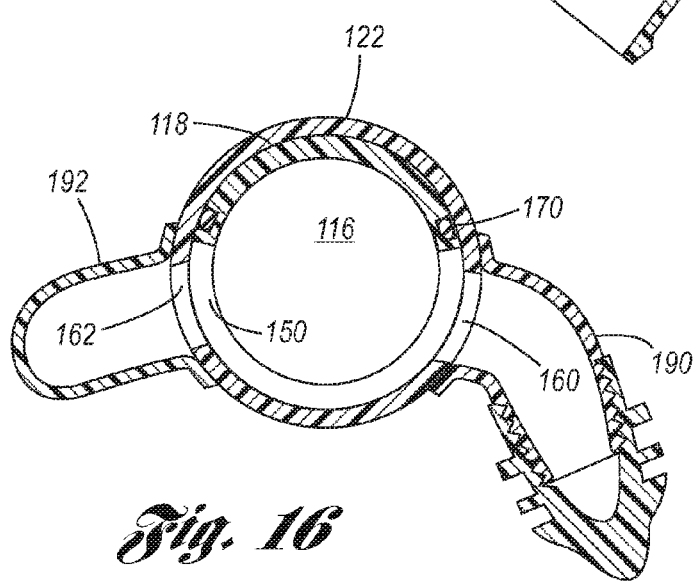
FIG. 16 is a sectional view of the compact four-way fluid flow control valve according to the present invention, seen along line 16-16 of FIG. 14, wherein 100% of fluid flow to the first outlet port is provided.

Turning attention firstly to FIGS. 14 through 16, depicted is a scenario in which 100% of fluid flow passes through the first outlet port 162. In this regard, the valve core 102 has been rotated with respect to the manifold 104 to the position 1 indicated at FIG. 15, wherein the inlet port 160 and the first outlet port 162 are fully open to the first core opening 150. Simultaneously, the valve core sidewall 118 with the aid of the second annular seal 172 has effectively closed the second and third outlet ports 164, 166 to fluid flow.

Turning attention next to FIGS. 17 through 19, depicted is a scenario in which 100% of fluid flow passes through the second outlet port 164. In this regard, the valve core 102 has been rotated with respect to the manifold 104 counterclockwise from the angular position 1 indicated at FIG. 15 to the angular position 2 indicated at FIG. 18, wherein the inlet port 160 is fully open to the first core opening 150, while the first outlet port 162 is closed to fluid flow via the core sidewall 118 aided by the first annular seal 170 having effectively closed all fluid flow at the first outlet port 160. Simultaneously, valve core sidewall with the aid of the second annular seal 172 has effectively closed all fluid flow at the third outlet port 166, while the second outlet port 164 is fully open to second core opening 152, whereby fluid flows from the inlet port into the first core opening, out the second core opening and into the second outlet port.

Turning attention now to FIGS. 20 through 22, depicted is a scenario in which 100% of fluid flow passes through the third outlet port 166. In this regard, the valve core 102 has been rotated with respect to the manifold 104 counterclockwise from the angular position 2 indicated at FIG. 18 to the angular position 3 indicated at FIG. 21, wherein the inlet port 160 is fully open to the first core opening 150, while the first outlet port 162 is closed to fluid flow via the core sidewall 118 aided by the first annular seal 170 having effectively closed all fluid flow at the first outlet port 160. Simultaneously, valve core sidewall with the aid of the third annular seal 174 has effectively closed all fluid flow at the second outlet port 164, while the third outlet port 166 is fully open to second core opening 152, whereby fluid flows from the inlet port into the first core opening, out the second core opening and into the third outlet port.

Figure 23:
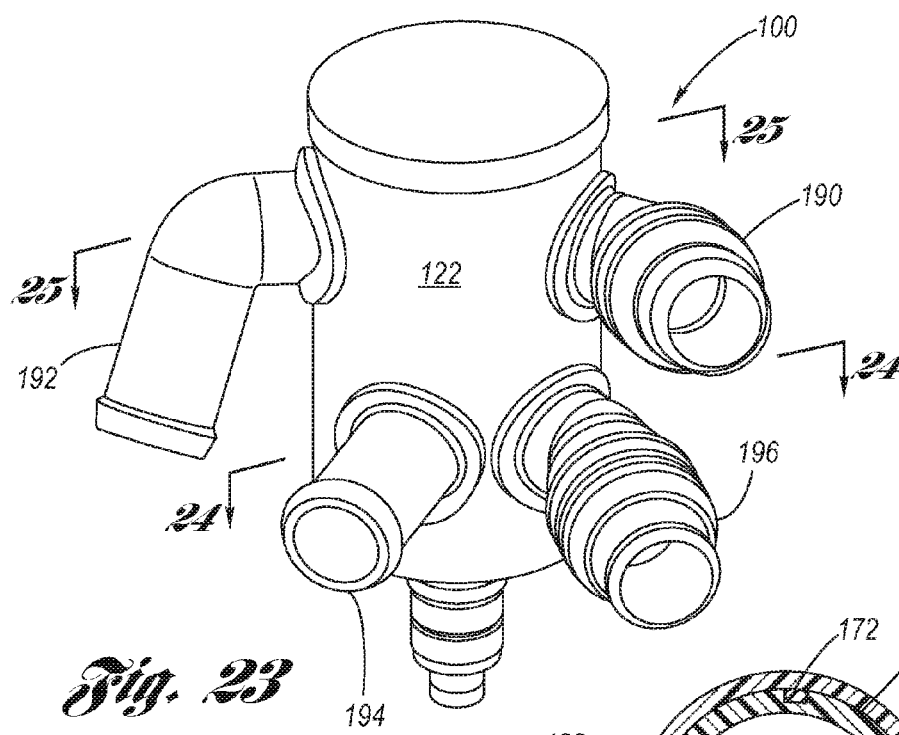
FIG. 23 is an isometric, front facing view of the compact four-way fluid flow control valve according to the present invention.
Figure 24:
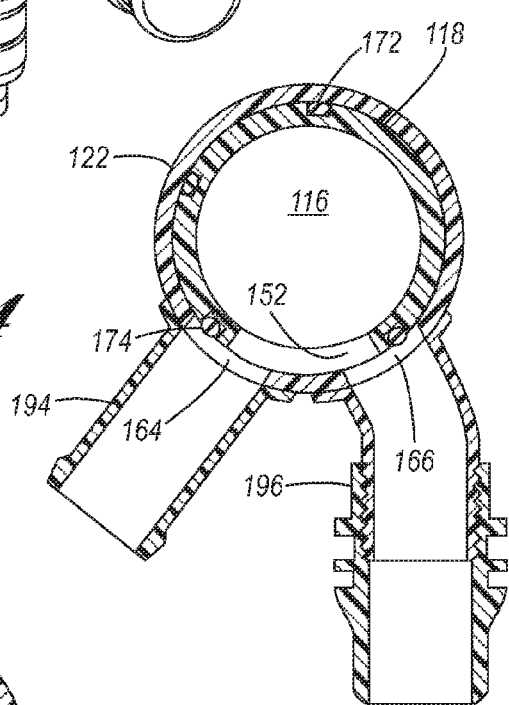
FIG. 24 is a sectional view of the compact four-way fluid flow control valve according to the present invention, seen along line 24-24 of FIG. 23, wherein 50% of fluid flow to each of the second and third outlet ports is provided.
Figure 25:
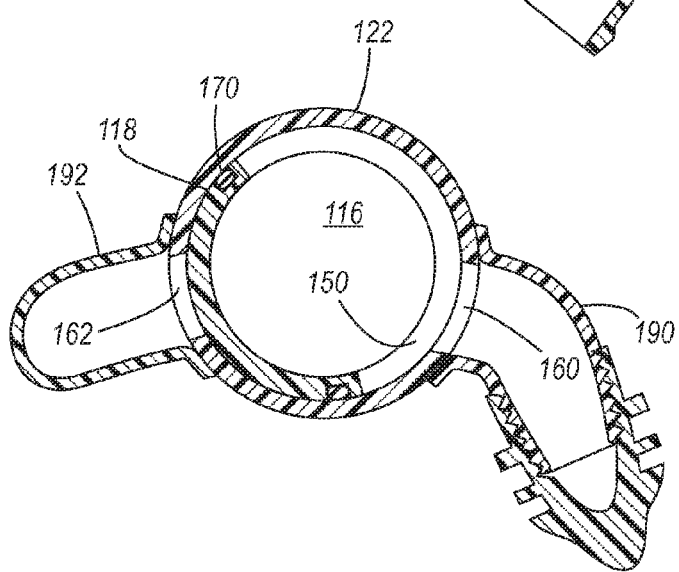
FIG. 25 is a sectional view of the compact four-way fluid flow control valve according to the present invention, seen along line 25-25 of FIG. 23, wherein 50% of fluid flow to each of the second and third outlet ports is provided.
Figure 26:
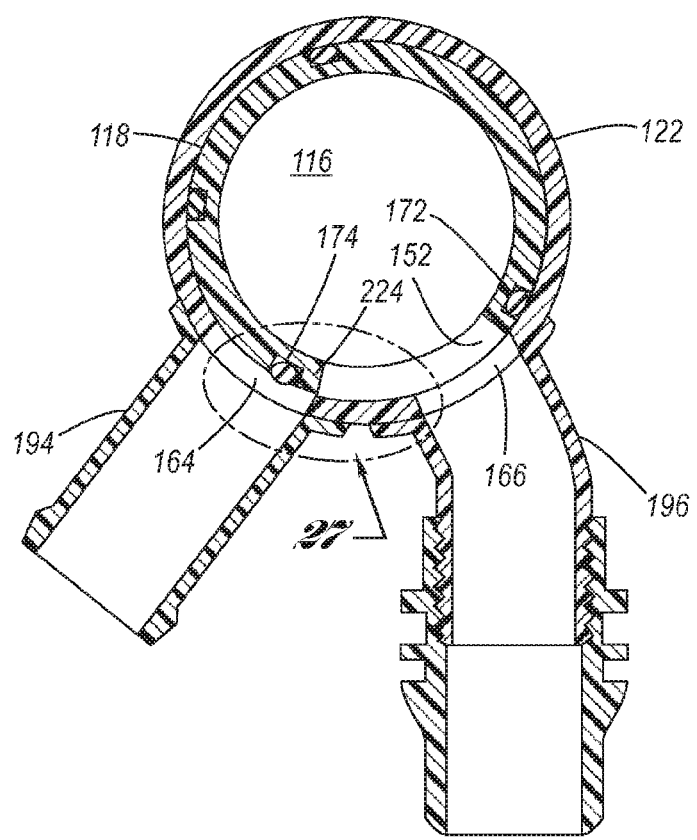
FIG. 26 is a sectional view of the compact four-way fluid flow control valve according to the present invention, showing a gap controlled fluid flow to the second outlet port.
Figure 27:
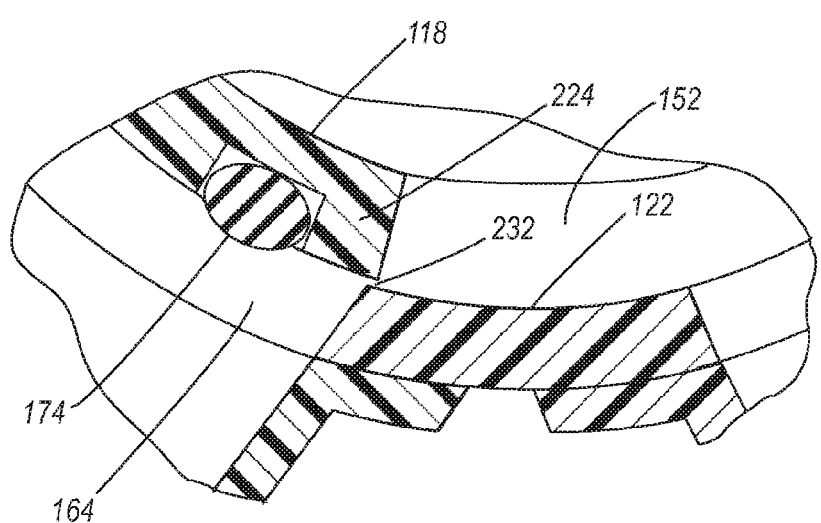
FIG. 27 is a detail sectional view of the compact four-way fluid flow control valve according to the present invention, seen at circle 27 of FIG. 26.

Turning attention next to FIGS. 23 through 25, depicted is a scenario in which 50% of fluid flow passes through each of the second and third outlet ports 164, 166. In this regard, it is seen that when the valve core 102 has been rotated with respect to the manifold 104 to the angular position as indicated in FIGS. 24 and 25, intermediate between that of FIGS. 18 and 21, wherein the inlet port 160 is fully open to the first core opening 150, while the first outlet port 162 is closed to fluid flow via the core sidewall 118 aided by the first annular seal 170. Simultaneously, the valve core sidewall 118 with the aid of the third annular seal 174 occludes 50% of the second outlet port 164 while the other 50% thereof is open to fluid flow via the second core opening 152, and the valve core sidewall with the aid of the second annular seal 172 occludes 50% of the third outlet port 166 while the other 50% thereof is open to fluid flow via the second core opening 152, whereby fluid flows from the inlet port into the first core opening, out the second core opening and equally into each of the second and third outlet ports.

It will be understood that similarly to the discussion with respect to FIGS. 23 through 25, if the angular position of the valve core 102 relative to the manifold 104 is disposed intermediate between that of FIGS. 15 and 18, then a scenario is provided in which the fluid flow from the inlet port 160 is delivered 50% to each of the first and second outlet ports 162, 164.

The foregoing description of operation is summed in the following Table I of port fluid flows resulting from progressing counterclockwise rotation of the valve core with respect to the manifold from angular position 1 at FIG. 15 to angular position 2 at FIG. 18 to angular position 3 at FIG. 21. Mixing of fluid, proportional with respect to the angular position, occurs between angular positions 1 and 2. For example, almost all the fluid flows out the first outlet port when the valve core is disposed near to angular position 1 to almost none flowing out the first outlet port when the valve core is disposed neat to angular position 2. Further for example, almost all the fluid flows out the second outlet port when the valve core is disposed near to angular position 2 to almost none flowing out the second outlet port when the valve core is disposed neat to angular position 3.

TABLE I

| Ang. Pos. | Inlet Flow | $1^{st}$ Outlet Flow | $2^{nd}$ Outlet Flow | $3^{rd}$ Outlet Flow |
| --- | --- | --- | --- | --- |
| 1 | 100% | 100% | none | none |
| bet. 1 and 2 | 100% | prop. mixing | prop. mixing | none |
| 2 | 100% | none | 100% | none |
| bet. 2 and 3 | 100% | none | prop. mixing | prop. mixing |
| 3 | 100% | none | none | 100% |

As shown at FIGS. 6 and 7, the first annular seal 170 has a first annular set back 220 from either side of the first core opening 150, the second annular seal 172 has a second annular set back 222 from one side of the second core opening 152, and the third annular seal 174 has a third annular set back 224 from the other side of the second core opening. As per the angular example described above respecting FIGS. 6 and 7, the first, second and third angular set backs 220, 222, 224 may have a respective angular range, additionally inclusive of one-half the diameter of the respective annular seals, 226, 228, 230 of about 10 degrees of arc.

As a result of the first, second and third angular set backs 220, 222, 224, an interstitial opening 232 at any of the first second and third outlet ports. An interstitial opening 232 occurs when the valve core is angularly positioned with respect to the manifold such that the core sidewall is in occluding relation thereto and one of the first, second and third annular seals has a portion thereof which is fully exposed in the respective one of the first, second and third outlet ports. When present, the interstitial opening 232 provides trickle fluid flow into the selected one of the first, second and third outlet ports. As demonstrated by FIGS. 26 and 27, the third angular set back 224 of the third the annular seal 174 allows fluid to trickle through the interstitial opening 232 into the second outlet port 164, while the third fluid port 166 is fully open.

To those skilled in the art to which this invention appertains, the above described preferred embodiment may be subject to change or modification. By way of example, the fluid flow control valve may be configured such that the manifold has the inlet port and the first outlet port, the valve core has the first core opening, and the first annular seal is disposed on the first blind portion of the core sidewall. Such change or modification can be carried out without departing from the scope of the invention, which is intended to be limited only by the scope of the appended claims.

The invention claimed is:
1. A fluid flow control valve, comprising:
a manifold comprising a cylindrical manifold sidewall, said manifold sidewall having formed therein an inlet port and a first outlet port, said inlet port and said first outlet port each being substantially bisected by a first valve plane, said manifold sidewall further having formed therein a second outlet port and a third outlet port each being substantially bisected by a second valve plane, wherein said first and second valve planes are mutually separated and oriented transverse to a longitudinal valve axis;
a valve core comprising a cylindrical core sidewall, said core sidewall being rotatively disposed within said manifold sidewall, said core sidewall having a first core opening formed therein, said first core opening being disposed so that when said valve core is rotated with respect to said manifold said first core opening is alignable with said inlet port and said first outlet port, said core sidewall further having a second core opening formed therein, said first and second core openings being mutually separated and disposed so that when said valve core is rotated with respect to said manifold, said first core opening is alignable with said inlet port and said first outlet port and said second core opening is alignable with said second and third outlet ports;

a first annular seal formed at a first blind portion of said core sidewall;

a second annular seal formed at a second blind portion of said core sidewall; and a third annular seal formed at a third blind portion of said core sidewall;

wherein said first annular seal is disposed in sealing relation to said manifold sidewall in non-circumscribing relation to said first core opening;

wherein said first, second and third annular seals are disposed in sealing relation to said manifold sidewall and are mutually separated from one another in non-circumscribing relation to either of said first and second core openings; and wherein said first, second and third annular seals are mutually disposed relative to said first and second core openings such that when said valve core is rotated with respect to said manifold, said inlet port fluidically communicates exclusively with any one of said first outlet port, said second outlet port and said third outlet port.

2. The fluid flow control valve of claim 1, wherein said first core opening is substantially bisected by said first valve plane, and said second core opening is substantially bisected by said second valve plane.

3. The fluid flow control valve of claim 2, wherein:
a) at a first selected angular position of said valve core with respect to said manifold, said inlet port and said first outlet port are fully open to said first core opening and said second and third outlet ports are sealed closed by said core sidewall and said second annular seal;
b) at a second selected angular position of said valve core with respect to said manifold, said inlet port is fully open to said first core opening, said first outlet port is sealed closed by said core sidewall and said first annular seal, said second outlet port is fully open to said second core opening and said third outlet port is sealed closed by said core sidewall and said second annular seal;
c) at a third selected angular position of said valve core with respect to said manifold, said inlet port is fully open to said first core opening, said first outlet port is sealed closed by said core sidewall and said first annular seal, said second outlet port is sealed closed by said core sidewall and said third annular seal, and said third outlet port is fully open to said second core opening;
d) at any angular position of said valve core with respect to said manifold between said first and second angular positions, said inlet port is fully open to said first core opening, said first outlet port is partly open to said first core opening, said second outlet port is partly open to said second core opening, and said third outlet port is sealed closed; and
e) at any angular position of said valve core with respect to said manifold between said second and third angular positions, said inlet port is fully open to said first core opening, said first outlet port is sealed closed, and said second and third outlet ports are partly open to said second core opening.

4. The fluid flow control valve of claim 3, wherein said first annular seal is disposed in set back relation to either side of said first core opening, said second annular seal is disposed in set back relation to a side of said second core opening, and said third annular seal is disposed in set back relation to the other side of said second core opening, wherein an interstitial opening of any of said first, second and third outlet ports is provided when said valve core is angularly positioned with respect to said manifold such that the core sidewall is in occluding relation thereto and one of said first, second and third annular seals has a portion thereof fully exposed in the respective one of said first, second and third outlet ports.

5. The fluid flow control valve of claim 4, further comprising an overmold of said core sidewall, wherein said first, second and third annular seals comprise convex loops integrally formed of said overmold.

6. The fluid flow control valve of claim 1, wherein said first, second and third annular seals comprise O-rings.

7. The fluid flow control valve of claim 1, further comprising an overmold of said core sidewall, wherein said first, second and third annular seals comprise convex loops integrally formed of said overmold.

8. The fluid flow control valve of claim 1, wherein:
a) at a first selected angular position of said valve core with respect to said manifold, said inlet port and said first outlet port are fully open to said first core opening and said second and third outlet ports are sealed closed by said core sidewall and said second annular seal;
b) at a second selected angular position of said valve core with respect to said manifold, said inlet port is fully open to said first core opening, said first outlet port is sealed closed by said core sidewall and said first annular seal, said second outlet port is fully open to said second core opening and said third outlet port is sealed closed by said core sidewall and said second annular seal;
c) at a third selected angular position of said valve core with respect to said manifold, said inlet port is fully open to said first core opening, said first outlet port is sealed closed by said core sidewall and said first annular seal, said second outlet port is sealed closed by said core sidewall and said third annular seal, and said third outlet port is fully open to said second core opening;
d) at any angular position of said valve core with respect to said manifold between said first and second angular positions, said inlet port is fully open to said first core opening, said first outlet port is partly open to said first core opening, said second outlet port is partly open to said second core opening, and said third outlet port is sealed closed; and
e) at any angular position of said valve core with respect to said manifold between said second and third angular positions, said inlet port is fully open to said first core opening, said first outlet port is sealed closed, and said second and third outlet ports are partly open to said second core opening.

9. The fluid flow control valve of claim 1, wherein said first annular seal is disposed in set back relation to either side of said first core opening, said second annular seal is disposed in set back relation to a side of said second core opening, and said third annular seal is disposed in set back relation to the other side of said second core opening, wherein an interstitial opening of any of said first, second and third outlet ports is provided when said valve core is angularly positioned with respect to said manifold such that the core sidewall is in occluding relation thereto and one of said first, second and third annular seals has a portion thereof fully exposed in the respective one of said first, second and third outlet ports.

10. An electronically controlled four-way fluid flow control valve, comprising:
- a manifold comprising a cylindrical manifold sidewall, said manifold sidewall having formed therein an inlet port and a first outlet port each being substantially bisected by a first valve plane, said manifold sidewall further having formed therein a second outlet port and a third outlet port each being substantially bisected by a second valve plane, wherein said first and second valve planes are mutually separated and oriented transverse to a longitudinal valve axis;
- a valve core comprising a cylindrical core sidewall, said core sidewall being rotatively disposed within said manifold sidewall, said core sidewall having a first core opening formed therein, said core sidewall further having a second core opening formed therein, said first and second core openings being mutually separated and disposed so that when said valve core is rotated with respect to said manifold, said first core opening is alignable with said inlet port and said first outlet port and said second core opening is alignable with said second and third outlet ports, said valve core further comprising:
  - a first annular seal formed at a first blind portion of said core sidewall;
  - a second annular seal formed at a second blind portion of said core sidewall; and
  - a third annular seal formed at a third blind portion of said core sidewall;
  - wherein said first, second and third annular seals are disposed in sealing relation to said manifold sidewall and are mutually separated from one another in non-circumscribing relation to either of said first and second core openings; and
- an electronic drive system drivingly connected to said valve core;
- wherein said first, second and third annular seals are mutually disposed relative to said first and second core openings such that when said valve core is rotated with respect to said manifold, said inlet port fluidically communicates exclusively with any one of said first outlet port, said second outlet port and said third outlet port.

11. The electronically controlled four-way fluid flow control valve of claim 10, wherein said first core opening is substantially bisected by said first valve plane, and said second core opening is substantially bisected by said second valve plane.

12. The electronically controlled four-way fluid flow control valve of claim 11, wherein:
- a) at a first selected angular position of said valve core with respect to said manifold, said inlet port and said first outlet port are fully open to said first core opening and said second and third outlet ports are sealed closed by said core sidewall and said second annular seal;
- b) at a second selected angular position of said valve core with respect to said manifold, said inlet port is fully open to said first core opening, said first outlet port is sealed closed by said core sidewall and said first annular seal, said second outlet port is fully open to said second core opening and said third outlet port is sealed closed by said core sidewall and said second annular seal;
- c) at a third selected angular position of said valve core with respect to said manifold, said inlet port is fully open to said first core opening, said first outlet port is sealed closed by said core sidewall and said first annular seal, said second outlet port is sealed closed by said core sidewall and said third annular seal, and said third outlet port is fully open to said second core opening;
- d) at any angular position of said valve core with respect to said manifold between said first and second angular positions, said inlet port is fully open to said first core opening, said first outlet port is partly open to said first core opening, said second outlet port is partly open to said second core opening, and said third outlet port is sealed closed; and
- e) at any angular position of said valve core with respect to said manifold between said second and third angular positions, said inlet port is fully open to said first core opening, said first outlet port is sealed closed, and said second and third outlet ports are partly open to said second core opening.

13. The electronically controlled four-way fluid flow control valve of claim 12, wherein said first annular seal is disposed in set back relation to either side of said first core opening, said second annular seal is disposed in set back relation to a side of said second core opening, and said third annular seal is disposed in set back relation to the other side of said second core opening, wherein an interstitial opening of any of said first, second and third outlet ports is provided when said valve core is angularly positioned with respect to said manifold such that the core sidewall is in occluding relation thereto and one of said first, second and third annular seals has a portion thereof fully exposed in the respective one of said first, second and third outlet ports.

14. The electronically controlled four-way fluid flow control valve of claim 13, further comprising an overmold of said core sidewall, wherein said first, second and third annular seals comprise convex loops integrally formed of said overmold.

15. The electronically controlled four-way fluid flow control valve of claim 10, wherein said first, second and third annular seals comprise O-rings.

16. The electronically controlled four-way fluid flow control valve of claim 15, further comprising an overmold of said core sidewall, wherein said first, second and third annular seals comprise convex loops integrally formed of said overmold.

17. The electronically controlled four-way fluid flow control valve of claim 10, wherein:
- a) at a first selected angular position of said valve core with respect to said manifold, said inlet port and said first outlet port are fully open to said first core opening and said second and third outlet ports are sealed closed by said core sidewall and said second annular seal;
- b) at a second selected angular position of said valve core with respect to said manifold, said inlet port is fully open to said first core opening, said first outlet port is sealed closed by said core sidewall and said first annular seal, said second outlet port is fully open to said second core opening and said third outlet port is sealed closed by said core sidewall and said second annular seal;
- c) at a third selected angular position of said valve core with respect to said manifold, said inlet port is fully open to said first core opening, said first outlet port is sealed closed by said core sidewall and said first annular seal, said second outlet port is sealed closed by said core sidewall and said third annular seal, and said third outlet port is fully open to said second core opening;
- d) at any angular position of said valve core with respect to said manifold between said first and second angular positions, said inlet port is fully open to said first core opening, said first outlet port is partly open to said first core opening, said second outlet port is partly open to said second core opening, and said third outlet port is sealed closed; and e) at any angular position of said valve core with respect to said manifold between said second and third angular positions, said inlet port is fully open to said first core opening, said first outlet port is sealed closed, and said second and third outlet ports are partly open to said second core opening.

18. The electronically controlled four-way fluid flow control valve of claim 10, wherein said first annular seal is disposed in set back relation to either side of said first core opening, said second annular seal is disposed in set back relation to a side of said second core opening, and said third annular seal is disposed in set back relation to the other side of said second core opening, wherein an interstitial opening of any of said first, second and third outlet ports is provided when said valve core is angularly positioned with respect to said manifold such that the core sidewall is in occluding relation thereto and one of said first, second and third annular seals has a portion thereof fully exposed in the respective one of said first, second and third outlet ports.

* * * * *